(12) United States Patent
Schenk

(10) Patent No.: US 8,717,864 B2
(45) Date of Patent: May 6, 2014

(54) CROSSTALK MITIGATION IN TRANSMISSION SYSTEM

(75) Inventor: Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 148 days.

(21) Appl. No.: 13/479,242

(22) Filed: May 23, 2012

(65) Prior Publication Data

US 2012/0327986 A1 Dec. 27, 2012

Related U.S. Application Data

(60) Provisional application No. 61/488,868, filed on May 23, 2011.

(51) Int. Cl.
*H04J 3/10* (2006.01)

(52) U.S. Cl.
USPC ........... 370/201; 370/431; 455/63.1; 379/417

(58) Field of Classification Search
None
See application file for complete search history.

(56) References Cited

U.S. PATENT DOCUMENTS

| 7,852,742 | B2 * | 12/2010 | Schenk | 370/201 |
| 8,233,376 | B2 * | 7/2012 | Ilani | 370/201 |
| 8,441,912 | B2 * | 5/2013 | Clausen | 370/201 |
| 8,514,687 | B2 * | 8/2013 | Chow | 370/201 |
| 2007/0268811 | A1 * | 11/2007 | Clausen | 370/201 |
| 2008/0089433 | A1 * | 4/2008 | Cho et al. | 375/267 |
| 2009/0046568 | A1 * | 2/2009 | Xu | 370/201 |
| 2009/0175156 | A1 * | 7/2009 | Xu | 370/201 |
| 2009/0271550 | A1 * | 10/2009 | Clausen et al. | 710/269 |
| 2010/0046593 | A1 * | 2/2010 | Schenk et al. | 375/222 |
| 2010/0177838 | A1 * | 7/2010 | Schenk | 375/285 |
| 2010/0278033 | A1 * | 11/2010 | Ilani | 370/201 |

* cited by examiner

*Primary Examiner* — Brian Roberts
(74) *Attorney, Agent, or Firm* — SpryIP, LLC

(57) ABSTRACT

Representative implementations of devices and techniques communication circuitry configured to communicate via a plurality of transmission channels, the communication circuitry includes crosstalk reduction circuitry to reduce crosstalk for a part of the plurality of transmission channels, the part of the plurality of transmission channels is selected from the plurality of transmission channels depending on an error threshold value.

15 Claims, 5 Drawing Sheets

CROSSTALK MITIGATION IN TRANSMISSION SYSTEM

RELATED APPLICATIONS

This application is a Non-Provisional application of Provisional Application 61/488,868, which was filed on May 23, 2011. Priority of the Provisional Application is hereby claimed and the entire contents of the Provisional Application are incorporated herein by reference.

BACKGROUND

So-called vectoring or vectored data transmission is a technique for coordinated transmission or reception of data from a plurality of transmitters to a plurality of receivers via a plurality of transmission channels in order to improve the transmission, for example to reduce the influence of crosstalk.

In DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication lines which are processed jointly are sometimes referred to as a vectored group.

For this kind of crosstalk reduction, for example in an initialization phase of the data transmission system or during operation of the data transmission system, parameter describing the crosstalk between the communication connections are obtained and the crosstalk reduction is performed based on these parameters.

The computational effort of this crosstalk reduction increases with increasing number of transmission channels, for example communication lines, involved. Therefore, in transmission systems involving a large number of transmission channels, sometimes so-called partial vectoring is used, where only a part of the transmission channels are subjected to vectoring. In this case, a selection has to be made which transmission channels or which crosstalk paths add to the vectored group.

Another possible approach to reduce crosstalk in communication systems is so-called spectrum balancing. In this approach, transmission powers for the individual transmission channels are controlled to reduce the effect of crosstalk at least for some transmission channels.

According to the current VDSL-vector standard, which is defined in ITU G993.5, Self-FEXT Cancellation (Vectoring) for use with VDSL2 transceivers, the entire contents of which is incorporated herein by reference, two training phases are defined for learning the canceller coefficients: VECTOR-1 and VECTOR-2. During the VECTOR-1 phase the coefficients are determined for cancelling the FEXT disturbing the active lines of a vectored group caused by the joining line which has to be trained. During the VECTOR-2 phase the coefficients for cancelling the FEXT caused by the active lines and disturbing the joining line have to be determined. To update the right coefficients from the beginning it may be desirable to select the FEXT paths which should be cancelled before the coefficients are estimated during VECTOR-1 and VECTOR-2 training phases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
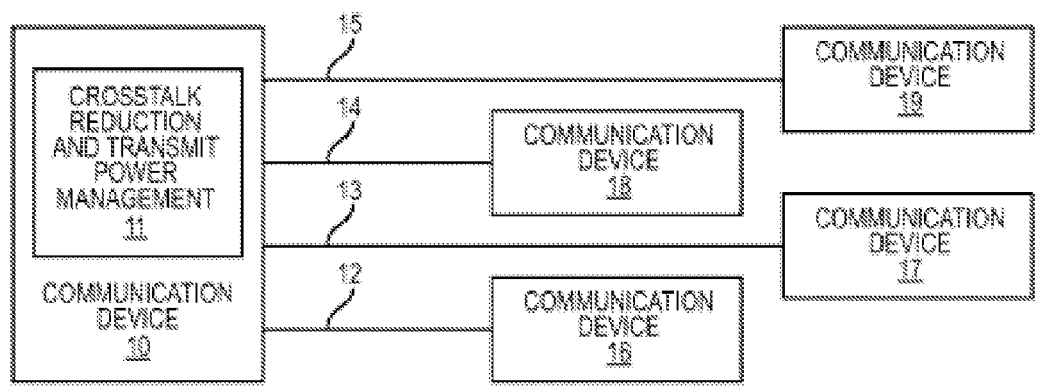
FIG. 1 is a block diagram illustrating basic structure of a communication system in which the techniques in accordance with the present disclosure may be implemented.

In the following, some implementations of the present invention will be described in detail. It is to be understood that the following description is given only for the purpose of illustration and is not to be taken in a limiting sense. The scope of the invention is not intended to be limited by the implementations described hereinafter with reference to the accompanying drawings, but is to be intended only to be limited by the appended claims and equivalents thereof.

It is also to be understood that in the following description of implementations any direct connection or coupling between functional blocks, devices, components, circuit elements or other physical or functional units shown in the drawings or described herein, i.e. any connection without intervening elements could also be implemented by an indirect connection or coupling, i.e. a connection or coupling with one or more intervening elements. Furthermore, it should appreciated that functional blocks or units shown in the drawings may be implemented as separate circuits in implementations, but may also be fully or partially implemented in a common circuit in other implementations. It is further to be understood that any connection which is described as being wire-based in the following specification may also be implemented as a wireless communication unless noted to the contrary.

It should be noted that the drawings are provided to give an illustration of some aspects of implementations of the present invention and therefore are to be regarded as schematic only. In particular, the elements shown in the drawings are not necessary to scale with each other, and the placement of various elements in the drawings is chosen to provide a clear understanding of the respective implementation and is not to be construed as necessarily being a representation of the actual relative locations of the various components in implementations according to an implementation of the invention.

It is to be noted that describing an implementation comprising a plurality of features is not to be construed as indicating that all these features are necessary for practicing the present invention. Instead, in other implementations, some features may be omitted, replaced by different features and/or additional features may be present.

The features of the various implementations described herein may be combined with each other unless specifically noted otherwise.

The term "transmission channel" as used herein is intended to refer to any kind of transmission channel including wire-based transmission channels like a copper line or a pair of copper lines and wireless transmission channels.

The term "sub-channel" as used herein is intended to refer to a sub-channel on a transmission channel, wherein on a single transmission channel a plurality of sub-channels may be present. For example, in DSL communication on a single wireline data is transmitted on a plurality of carriers having different frequencies, these carriers also being referred to as "tones". Such carriers or tones are examples for sub-channels for the case of DSL data transmission. Another example for a sub-channel is a logic channel which may be used for transmitting specific kinds of data, for example control information, wherein such a logic channel may use one or more of the above-mentioned carriers or tones in DSL communication.

Turning now to the Figures, in a communication system shown in FIG. 1, a communication device 10 communicates with communication devices 16, 17, 18 and 19 via respective transmission channels 12, 13, 14 and 15. While in FIG. 1 four communication devices 16, 17, 18 and 19 are shown, in other implementations any suitable other number of communication devices may also be provided.

In an implementation, the communication via transmission channels 12, 13, 14 and 15 is a bidirectional communication. In such an implementation, communication device 10 may comprise a transceiver for each of the transmission channels 12, 13, 14 and 15, and each communication device 16, 17, 18 and 19 also may comprise a transceiver. In another implementation, all or some of transmission channels 12, 13, 14 and 15 may be unidirectional transmission channels. In another implementation, all or some of the communication devices 16, 17, 18, 19 might be co-located.

In the implementation of FIG. 1, couplings between the transmission channels 12-15 may cause so-called far-end crosstalk (FEXT), for example if some or all of the transmission channels are wirelines running close to each other. Through at least partial joint processing of the signals transmitted from communication device 10 to communication device 16, 17, 18 and 19 and/or through at least partial joint processing of signals received from communication devices 16, 17, 18 and 19 at communication device 10 in a crosstalk reduction unit 11, the influence of such crosstalk may be reduced. The joint processing for crosstalk reduction is also referred to as vectoring, and the transmission channels which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In implementations, crosstalk cancellation may for example be performed by calculating received signals for each transmission channel depending on a linear combination of all received signals on all transmission channels of the vectored group, and crosstalk precompensation may be performed by calculating signals to be transmitted via each transmission channel depending on a linear combination of signals to be transmitted on all transmission channels. However, other calculation methods, for example non-linear calculations, are also possible.

In order to perform such a crosstalk reduction, i.e. the vectoring, the crosstalk reduction unit 11 has to be "trained", i.e. the crosstalk reduction unit 11 needs information regarding the actual crosstalk occurring between the transmission channels in the vectored group. This may for example be achieved by transmitting predetermined training signals, for example pilot signals, via the transmission channels and analyzing the received signals to determine the crosstalk. In implementations, data transmission via the transmission channels comprises the transmission of pilot signals or symbols, wherein between the pilot signals other data like payload data may be transmitted. In an implementation, the pilot signals or modified pilot signals are used for training crosstalk reduction unit 11. In an implementation, synchronization signals or synchronization symbols may be used as pilot signals. However, other training signals may also be used.

In an implementation, some or all of the transmission channels 12-15 of FIG. 1 comprise a plurality of sub-channels.

It should be noted that in some cases sub-channels used for the downstream direction will be different from sub-channels used for the upstream direction. For example, in DSL communication the sub-channels for the downstream direction may use (a) different frequency range(s) than the sub-channels in the upstream direction.

In such implementations, for training in the downstream direction communication device 10 may transmit the above-mentioned training signals on some or all sub-channels of communication lines 12 to 15 to communication devices 16 to 19. Communication devices 16 to 19 then return error signals indicative of a deviation between the received training signals and the sent training signals back to communication device 10. Based on these error signals, crosstalk reduction unit 11 calculates first crosstalk reduction parameters for the downstream direction, which may also be referred to as crosstalk precompensation parameters or crosstalk precompensation coefficients. The error signals constitute crosstalk information indicative of the crosstalk occurring between the sub-channels of the communication channels 12 to 15. A similar approach may be made for the upstream direction.

In an implementation, only some of the transmission channels connected to communication device 10 are subjected to vectoring. This is also referred to as partial vectoring. A reason may for example be the computational complexity involved. For example, if 1,000 transmission channels are coupled with communication device 10, performing a complete vectoring of these 1,000 transmission channels may in some cases exceed the computational capabilities of processors or other equipment used for vectoring involved. Therefore, in such cases partial vectoring with only some of the transmission channels may be performed.

In such an implementation, a selection is made with which of the plurality of transmission channels present the vectoring is to be performed. It should be noted that this selection need not be the same for upstream and downstream direction. The transmission channels which are involved in the vectoring are also referred to as vectored group.

In an implementation, different transmission channels may lead to different communication devices, for example to communication devices 16 to 19 of FIG. 1, of customers having different contracts with a provider of a communication service via for example communication device 10. For example, different maximum data rates may be agreed upon in indifferent contracts. In other implementations, other criteria may be used to distinguish between transmission channels.

Based on such criteria, in an implementation weighting coefficients or weighting factors are provided for the plurality of transmission channels coupled with communication device 10. The weighting coefficients in an implementation reflect the relative "importance" of the transmission channels. For example, a transmission channel with a higher intended maximum data rate may have a higher weighting coefficient than a transmission channel with a lower intended maximum data rate.

In an implementation, the selection which transmission channels to include in the vectored group is made depending on these weighting coefficients. Additionally, the selection may be made depending on the strength of the crosstalk between the transmission channels.

In the following, some of the above concepts will be further illustrated using further implementations. As an example for an environment for implementing the present invention, these implementations DSL (digital subscriber line) systems like VDSL (very high bit rate DSL) systems are used.

In DSL systems, generally wire-based communication lines are used as transmission channels, for example pairs of copper lines, and on each communication lines data is modulated onto a plurality of carrier or tones, i.e. different frequency sub-channels. However, it is to be noted that in other implementations other kinds of communication systems including wireless communication systems may be used.

Figure 2:
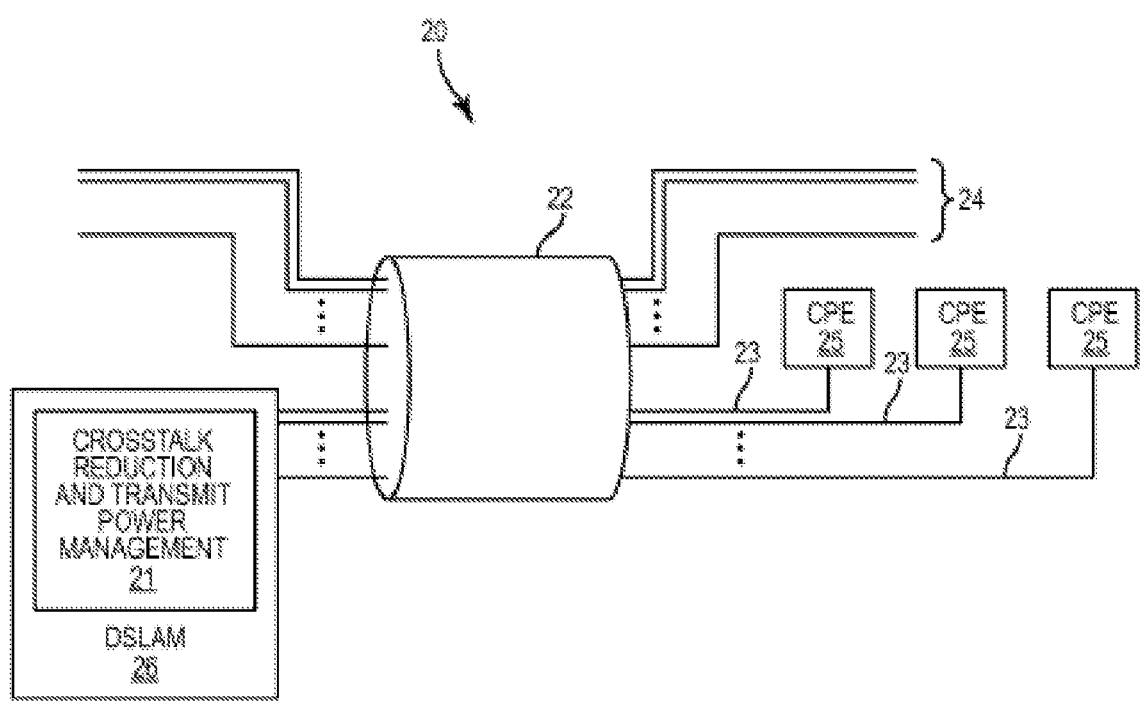
FIG. 2 is a block diagram illustrating various features of a communication system.

A DSL communication system 20 shown in FIG. 2 comprises a plurality of so-called subscribers 25. The equipment of subscribers 25 is sometimes also referred to as customers premises equipment and may for example comprise DSL modems for connecting personal computers or other equipment with a so-called central office of a service provider.

In the communication system 20 of FIG. 2, each of the subscribers 25 is coupled to a central office equipment 26 via a respective transmission channel in the form of a communication line 23. In the example of FIG. 2, the central office equipment 26 is a DSLAM (digital subscriber line access multiplexer). In the implementation of FIG. 2, DSLAM 26 comprises a crosstalk reduction and transmit power management unit 21 which controls vectoring or partial vectoring of communication lines 23 by crosstalk cancellation or crosstalk precompensation (so-called Spectrum Management Level 3) and to perform a power management, i.e. to adjust the transmit power used by a different ones of communication lines 23 (Spectrum Management Level 2).

The DSLAM 26 comprises a plurality of transmission ports, each coupled to a respective communication line 23. It should be noted while in the implementation of FIG. 2 crosstalk reduction and transmit power management unit 21 is located within DSLAM 26, in other implementations unit 21 may be a unit external to DSLAM 26.

In the implementation shown, the communication lines are bundled in a single cable binder 22. Such bundling in a cable binder generally increases the likelihood of crosstalk, for example far-end crosstalk, occurring between communication lines 23. However, in other implementations some or all of communication lines 23 need not be in a common cable binder.

As illustrated in FIG. 2, the cable binder 22 may also comprise additional communication lines 24 which are not used by the DSL communication system 20, for example analog telephone lines.

It should be noted that the communication lines 23 may have different lengths, which is typical for a situation in which the individual subscribers 25 are located at different positions. However, some or all of communication lines 23 may also have the same length.

The crosstalk reduction and transmit power management unit 21 may control crosstalk reduction and the transmit power on the individual lines both for the downstream direction, i.e., the transmission direction from DSLAM 26 to subscribers 25, and in the upstream direction, i.e., in the direction from subscribers 25 to DSLAM 26.

Figure 3:
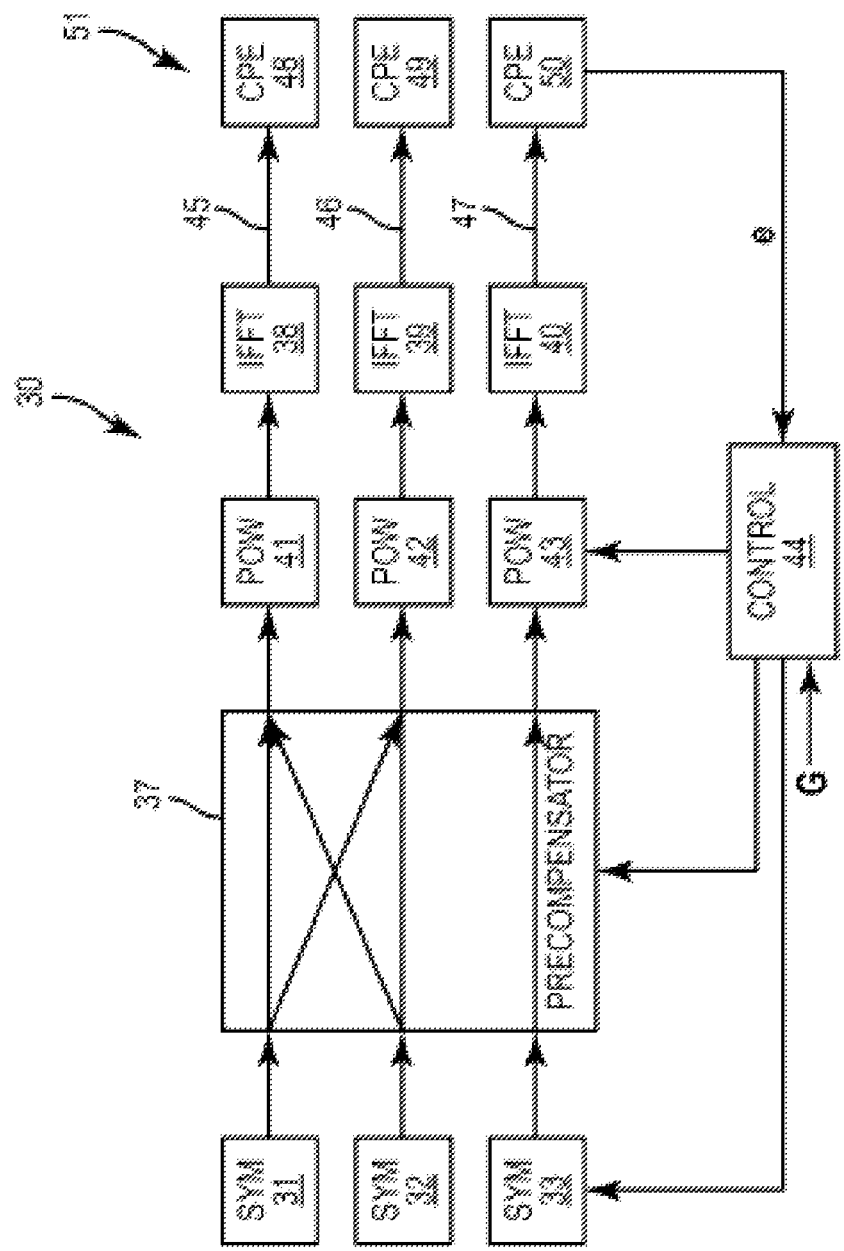
FIG. 3 is a block diagram illustrating various features of a communication system.

In order to illustrate this, in FIG. 3 some components of a central office equipment 30 according to an implementation are schematically shown in FIG. 3. Central office equipment 30 may for example be incorporated in DSLAM 26 of FIG. 2.

Central office equipment 30 shows some components used for transmitting data in the downstream direction over a plurality of communication lines 45, 46, 47. While three communication lines are shown as an example in FIG. 3, any number of communication lines may be present, for example 1,000 communication lines or more.

Via communication lines 45, 46 and 47 communication device 30 is linked to subscribers 48, 49, 50, the subscriber end of the communication lines being generally labelled 51 in the FIG. 3.

In device 30 of the implementation of FIG. 30, symbol mappers 31, 32 and 33 map data, for example payload or training data, onto carrier constellations, i.e., a plurality of carriers or tones each carrier having its own frequency range, or, in other words, a plurality of sub-channels. The data is to be transmitted via communication lines 45, 46, 47 to the respective subscribers 48, 49 and 50. A crosstalk precompensator 37 which is an example for crosstalk reduction circuitry modifies some or all of these symbol mappings in order to precompensate crosstalk occurring during the transmission via communication lines 45, 46, 47. In particular, in the implementation of FIG. 3 crosstalk precompensator 37 performs a so-called partial vectoring, i.e., only for some of the communication lines involved vectoring is performed. For example, as indicated by arrows within precompensator 37 of FIG. 3, in the example illustrated a partial vectoring is performed for communication lines 45 and 46, i.e., communication lines 45 and 46 form a vectored group, while no vectoring is performed for communication line 47. This is only to be seen as an example and criteria for choosing which communication lines to add to a vectored group and corresponding methods which may be implemented in control 44 which controls which communication lines are added to the vectored group will be explained further below.

For example, for partial vectoring, the symbols output by the symbol mappers associated with the communication lines of the vectored group, in the example shown symbol mappers 31 and 32, may be seen as a vector which is multiplied with a matrix comprising crosstalk precompensation coefficients. In other words, the symbols output by precompensator 37 are, for the communication lines of the vectored group, linear combinations of the symbol input to precompensator 37 for the vectored group, where the crosstalk precompensation coefficients are chosen such that the effect of crosstalk between the communication line of the vectored group is precompensated. With the above method, far-end crosstalk between the vectored lines may be reduced or cancelled altogether. In other implementations, instead of simply selecting communication lines to be added to the vectored group, certain FEXT branches may be added. A FEXT branch in this respect is a crosstalk path from a first transmission channel to a second transmission channel. For example, in the system of FIG. 3 for partial vectoring only crosstalk from communication line 47 to communication line 46 and from communication line 46 to communication line 45 may be cancelled, while other FEXT branches like from communication line 47 to communication line 45 are not added to the vectored group.

The carrier mappings modified by precompensator 37 are modulated onto the above mentioned plurality of carriers for each communication line. Power regulators 41, 42, 43 adjust transmit power levels of the individual carriers and therefore of the signal to be transmitted via communication lines 45, 46 and 47. The individual power levels of the carriers are controlled by control circuit 44 in the implementation of FIG. 3. Power regulators 41, 42, 43 may e.g. be implemented in a digital signal processor which multiplies the mapped constellations with power adjustment factors. Then, the signals are transferred to signals in the time domain by inverse fast Fourier transformers 38, 39 and 40. It should be noted that while in the implementation of FIG. 3 transmit power levels are adjusted individually for each carrier, in other implementations, the transmit power may be adjusted globally for all carriers of a communication line, for example by controlling an amplifier (not shown) downstream of the respective transformer 38, 39, 40.

Generally, the number of bits which can be mapped onto each carrier in symbol mappers 31 to 33 depends on the signal to noise ratio (SNR) for the various carriers, which in turn depends both on the power level with which the signals are transmitted and on the amount of crosstalk. Therefore, precompensating crosstalk in precompensator 37 and/or increasing the transmission power used for the individual carrier may increase the number of bits which can be mapped onto the respective carrier of the respective communication lines and therefore increase the bit rate. On the other hand, increasing transmission power for some or all carriers on one line may increase the crosstalk from this line to other lines, thereby potentially lowering the possible bit rate for the other lines. The number of bits which are mapped onto the respective carriers in the implementation of FIG. 3 is also controlled by control circuit 44.

In order for example to determine the crosstalk between the various lines and/or to determine precompensation coefficients to be used by precompensator 37, as already mentioned training sequences, i.e., known symbols, are sent via communication lines 45, 46 and 47, and an error signal e is sent back to control circuit 44 by subscribers 48, 49 and 50, the error signal e being indicative of deviations between the transmitted signals sent by device 30 via communication lines 45, 46, 47 and the symbols received by subscribers 48, 49, 50.

Furthermore, as an input control circuit 44 receives a weighting vector G indicating relative weights of the various communication lines. These weights may for example be depending on an intended or agreed upon bit rate for the communication lines.

As a simple example, for communication lines 45 and 46 a first bit rate may be intended, and for communication line 47 a second bit rate being a half of the first bit rate may be intended. In such a case, the weighting vector G may be set to be equal to (1, 1, 0.5) to indicate that communication line 47 has half the intended bit rate compared with communication lines 45 and 46.

Control circuit 44 then controls precompensator 37, amplifiers 41 to 43 and also symbol mappers 31 to 33 depending on the weighting vector G and the error signal e.

It should be noted that in FIG. 3 only some components of communication device 30 are depicted, and subscribers 48, 49 and 50 are depicted as simple blocks in order to simplify the explanations by showing only elements which are relevant for the understanding of the respective implementation. Further components which are conventionally found in xDSL transmission systems may additionally be present, like encoders for Reed-Solomon coding or Tomlinson coding, serial/parallel and parallel/serial converters, and elements at subscribers 48, 49, 50 like fast Fourier transformers, filters, frequency equalizers or slicers.

Before examples for the operation of control circuit 44 will be described in more detail first an implementation of a corresponding system and devices for operation in the upstream direction will be explained with reference to FIG. 4.

Figure 4:
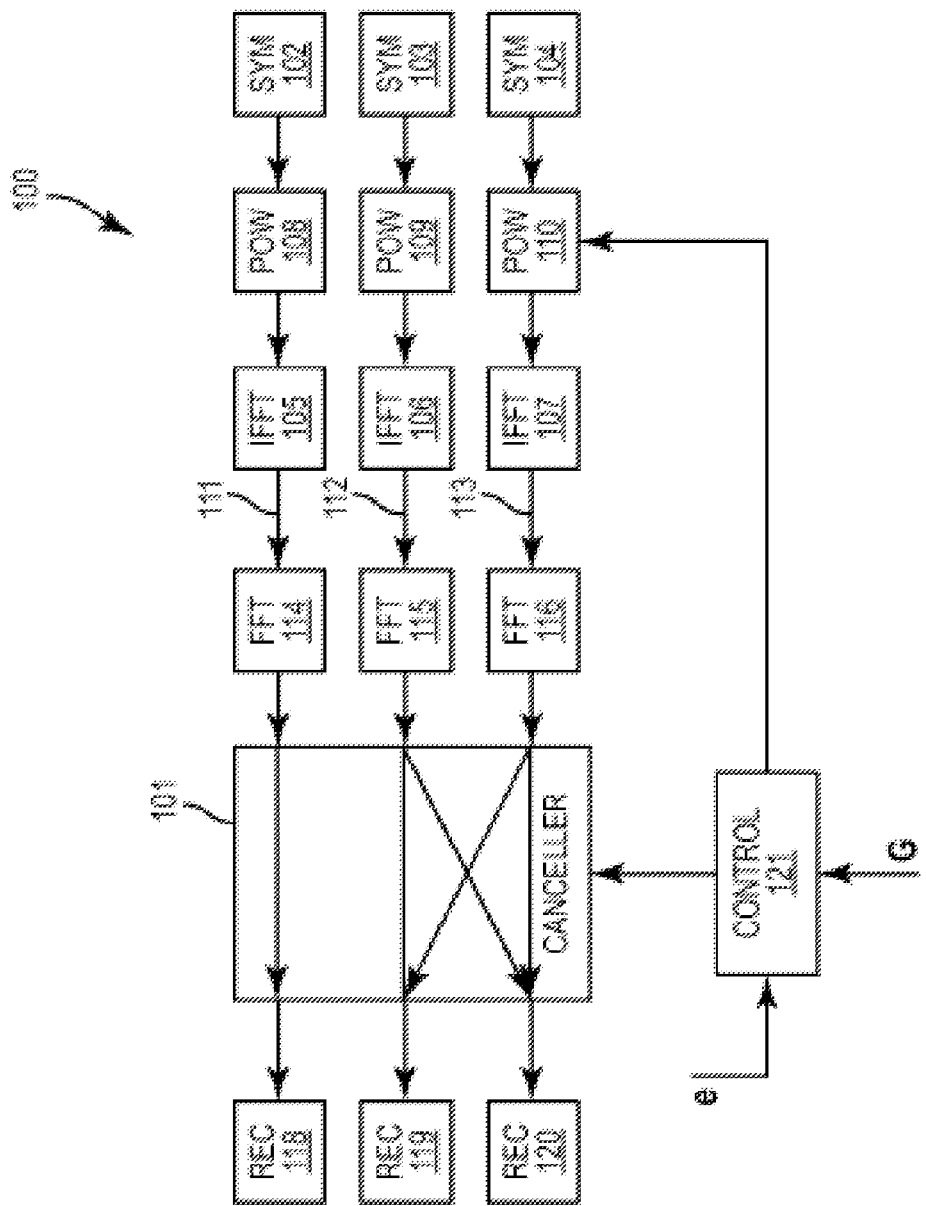
FIG. 4 is a block diagram illustrating various features of a communication system.

In the implementation of FIG. 4, subscribers on a subscriber side 100 transmit signals via communication lines 111, 112, 113 to central office equipment 101 which may, for example, be a DSLAM like DSLAM 26 of FIG. 2. It should be noted that for bidirectional communication systems, for example communication lines 111, 112 and 113 of the implementation of FIG. 4, may be physically identical to communication lines 45, 46 and 47 of the implementation of FIG. 3. In the implementation of FIG. 4, for each subscriber a symbol mapper 102, 103 and 104, an inverse fast Fourier transformer 105 and 106 and 107 and power regulators 108, 109 and 110, respectively, perform substantially the same functions and symbol mappers 31, 32, 33, inverse fast Fourier transformer 38, 39 and 40 and power regulators 41, 42 and 43 in communication device 30 of the implementation of FIG. 3, with the exception that no crosstalk precompensator is provided. In other words, for each communication line a respective symbol mapper 102, 103 and 104 maps data onto a plurality of carriers, the data is then modulated onto the carriers. The transmit power of the individual carriers is adjusted via power regulators 108, 109 and 110. The data is further transformed into the time domain by inverse fast Fourier transformers 105, 106 and 107 and transmitted via communication lines 111, 112 and 113. In case of bidirectional communication, the carriers, i.e., frequency ranges, used for the upstream direction may be different from the carriers used for the downstream direction. Similar to the downstream direction, the transmit power may additionally or alternatively be adjusted for all carriers of a communication line e.g. via an amplifier downstream of transformers 105, 106, 107.

Power regulators 108, 109 and 110 are controlled by a control circuit 121. Control circuit 121 in the implementation of FIG. 4 is located in communication device 101 on the central office side and may send control signals to amplifiers 108, 109 and 110 for example via a special logic channel on communication lines 111, 112 and 113, for example an overhead channel.

In communication device 101, received data is transferred to the frequency domain via fast Fourier transformers 114, 115 and 116 and then fed to a crosstalk canceller 117 which in the implementation of FIG. 4 is configured to perform a partial vectoring for some of communication lines 111, 112, 113. For example, in the situation shown in FIG. 4 communication lines 112, 113 form a vectored group and symbols output by crosstalk canceller 101 for these two lines are a linear combination of symbols received via these lines, similar to what has explained for crosstalk precompensator 37. For example, the received symbols for the vectored group may be written as a vector and multiplied with a matrix comprising crosstalk cancellation coefficients. The crosstalk cancellation in crosstalk canceller 101 is controlled by control circuit 121, which for example controls which communication lines form the vectored group. As has been explained with respect to FIG. 3, also in the implementation of FIG. 4 instead of adding communication lines to the vectored group, selected FEXT branches may be added.

The symbols output by crosstalk canceller 101 are further processed in receive circuitry 118, 119, 120 which may for example comprise frequency equalizers or slicers. Similar to FIG. 3 it should be noted that both on the subscriber line 100 and in communication device 101, further elements, for example elements conventionally found in DSL communication systems, may be present which, in order to provide a more concise explanation of features of the implementations shown, are omitted in FIG. 4.

Similar to what was described with respect to the implementation of FIG. 3, for determining crosstalk cancellation coefficients and/or for determining which lines to incorporate in the vectored group training symbols are sent from subscriber side 100 to communication device 101, and an error signal e is generated and fed to control circuit 121. Also a weighting vector G which may be identical, but also may be different to weighting vector G of FIG. 3, is fed to control circuit 121.

It should be noted that in a bidirectional communication systems control circuit 44 of FIG. 3 and control circuit 121 of FIG. 4 may be implemented in a common circuit, for example in a common processor. Likewise, crosstalk precompensator 37 and crosstalk canceller 101 may be implemented in the same circuit, which may comprise a processor, like a digital signal processor, which may, but need not be, the same processor as the one implementing control circuits 44 and 121. It should also be noted that in case of bidirectional communication, the elements and features of communication devices 30, 101 may be implemented in a single communication device, for example a single DSLAM.

Furthermore, while in the implementations of FIGS. 3 and 4, control circuits 44, 121 are shown as part of communication devices 30, 101, the control circuits may also be a further unit external to communication devices 30, 101.

In the following, the operation of control circuits 44, 121 will be described in more detail. In some implementations, the operation is basically the same both for the downstream and upstream direction and therefore will be explained only once in the following. In other words, the following description applies to implementations of the downstream direction and implementations of the upstream direction, and also to bidirectional implementations. With respect to bidirectional implementations, it should be noted that the choice for example which communication lines to incorporate into the vectored group may be made separately for the two communication directions, i.e., upstream and downstream, but may also be made jointly, such that the same communication lines are part of the vectored groups in upstream and downstream direction. Also, the transmission power of amplifiers used may be adjusted separately for upstream and downstream direction, but also may be adjusted jointly.

In the following, methods according to implementations of the present invention will be described which methods may be for example be implemented in crosstalk reduction and transmit power management unit 11 of FIG. 1, in crosstalk reduction and transmit power management unit 21 of FIG. 2 or in control circuit 44, 121 of FIGS. 3 and 4, but which may also be implemented separately therefrom.

According to an implementation of the present invention, the choice which communication lines or, more generally, which transmission channels or FEXT branches are to be incorporated into a vectored group is made based on error values measured when pilot symbols are sent in the communication system. In an implementation which will be discussed next, a DSL system with v active communication lines is used as an example, wherein on each communication line a number of carriers or frequency channels are used. In the DSL system with v active lines, one or more lines are added, referred to joining lines, from time-to-time. Two training phases generally take place when a line is allotted to join a vectored group of lines or a set of active communication lines. The first training phase is used to determine the FEXT caused by the joining line and disturbing the active lines, and the second training phase is used to determine the FEXT caused by the active lines and disturbing the joining line. In a particular embodiment, prior to the first training phase, or during the first training phase, a subset of the active lines v' is chosen based on the error sizes associated with each of the active lines v. The chosen subset of active lines v' is considered in the first and second training phases. That is, the first training phase is used to determine the FEXT caused by the joining line and disturbing the subset of active lines, and the second training phase is used to determine the FEXT caused by the subset of active lines and disturbing the joining line. Example error sizes may be determined according to the following in Table 1, where k is a given carrier of a communication line:

TABLE 1

| | |
|---|---|
| $e_v = \sum_k |err_v(k)|^2$ | squared absolute error |
| $e_v = \sum_k |err_v(k)|$ | absolute error |
| $e_v = \sum_k \{|Re\{err_v(k)\}| + |Im\{err_v(k)\}|\}$ | absolute error of real part and imaginary part |

Figure 5:
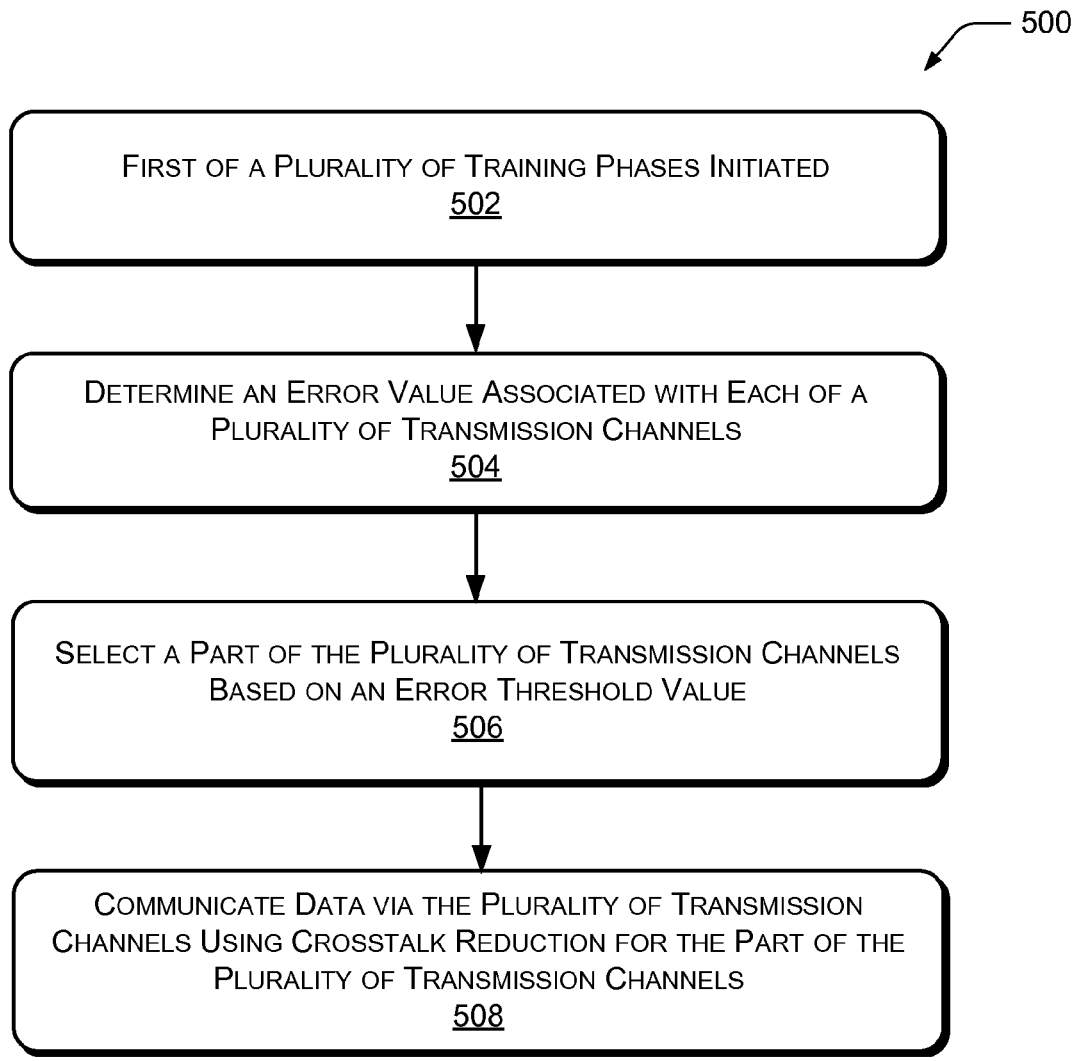
FIG. 5 illustrates a representative process for selecting crosstalk compensated transmission channels or communication lines.

FIG. 5 illustrates a representative process for selecting crosstalk compensated transmission channels or communication lines. The example process 500 may be performed on the communication device 10. The referenced communication lines may be, for example, communication lines 12 to 15. However, other communication devices and lines may also be used with the representative process 500.

At block 502, a first of a plurality of training phases is initiated by a communication device. The plurality of training phases may include a VECTOR-1 training phase and a VECTOR-2 training phase. During the VECTOR-1 phase the coefficients determined for cancelling the FEXT disturbing the active communication lines of a vectored group caused by a joining line which has to be trained. During the VECTOR-2 phase the coefficients for cancelling the FEXT caused by the active communication lines and disturbing the joining communication line have to be determined. To update the right coefficients from the beginning it may be desirable to select the FEXT paths that should be cancelled before the coefficients are estimated during VECTOR-1 and VECTOR-2 training phases.

At block 504, an error value associated with each of the transmission channels or communication lines in the communication system is determined. In one implementation, one of a squared absolute error calculation, an absolute error calculation, or an absolute error calculation having real and imaginary parts for each of the transmission channels or communication lines is made. See Table 1.

At block 506, a part of the transmission channels or communication lines in the communication system is selected based on an error threshold value. This is a so-called partial set of the transmission channels or communication channels that will be compensated for crosstalk. In one implementation, the error threshold value is a squared absolute error threshold value, an absolute error threshold value, or an absolute error threshold value having real and imaginary parts.

At block 508, the communication device communicates data via the plurality of transmission channels or communication lines using crosstalk reduction for a part of the transmission channels or communication lines in the communication system selected at block 506.

The order in which the process 500 is described is not intended to be construed as a limitation, and any number of the described process blocks can be combined in any order to implement the process, or alternate processes. Additionally, individual blocks may be deleted from the processes without departing from the spirit and scope of the subject matter described herein. Furthermore, the process can be implemented in any suitable hardware, software, firmware, or a combination thereof, without departing from the scope of the subject matter described herein.

In alternate implementations, other techniques may be included in the process 500 in various combinations, and remain within the scope of the disclosure.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. A communication device, comprising:
   communication circuitry configured to communicate via a plurality of transmission channels, wherein the communication circuitry comprises crosstalk reduction circuitry to reduce crosstalk for a part of the plurality of transmission channels, wherein the part of the plurality of transmission channels is selected from the plurality of transmission channels depending on an error threshold value.

2. The communication device of claim 1, wherein each of the transmission channels of the part of the plurality of transmission channels is determined to have an associated error threshold value that exceeds the error threshold value.

3. The communication device of claim 1, wherein the error threshold value is based on one of a squared absolute error calculation, an absolute error calculation, or an absolute error calculation having real and imaginary parts.

4. The communication device of claim 1, wherein the crosstalk reduction circuitry is configured to determine an error value associated with each transmission channel of the plurality of transmission channels.

5. The communication device of claim 4, wherein the determined error value associated with each transmission channel of the plurality of transmission channels is one of a squared absolute error calculation, an absolute error calculation, or an absolute error calculation having real and imaginary parts.

6. The communication device of claim 1, wherein the communication device is configured to select the part of the plurality of transmission channels from the plurality of transmission channels depending on an error threshold value during a first training phase of a plurality of training phases.

7. The communication device of claim 1, wherein the plurality of transmission channels are a plurality of xDSL communication lines.

8. A communication device comprising:
   a plurality of outputs to couple with a plurality of communication lines,
   a plurality of symbol mappers, each symbol mapper being associated with a respective output and configured to map data to be transmitted over the respective communication lines to a data symbol,
   a crosstalk precompensator configured to combine data symbols generated by a part of the symbol mappers to generate crosstalk precompensated data symbols for a part of the plurality of communication lines associated with the part of the symbol mappers, and a control circuit configured to select the part of the plurality of communication lines depending on an error threshold value.

9. The communication device of claim 8, wherein each of the communication lines of the part of the plurality of communication lines is determined by the control circuit to have an associated error threshold value that exceeds the error threshold value.

10. The communication device of claim 9, wherein the error threshold value is based on one of a squared absolute error calculation, an absolute error calculation, or an absolute error calculation having real and imaginary parts.

11. The communication device of claim 10, wherein the communication device is configured to select the part of the plurality of communication lines from the plurality of communication lines depending on an error threshold value during a first training phase of two training phases.

12. The communication device of claim 11, wherein the first training phase is for training a joining communication line and the second training phase is for active communication lines.

13. A method comprising:

determining an error value for each of a plurality of transmission channels associated with a communication system, selecting a part of the plurality of transmission channels depending an error threshold value, and communicating data via the plurality of transmission channels using crosstalk reduction for the part of the plurality of transmission channels.

14. The method of claim 13, wherein selecting the part of the plurality of transmission channels includes comparing each error value to the error threshold value and selecting the part of the plurality of transmission channels based on the comparison.

15. The method of claim 14, wherein the selecting the part of the plurality of transmission channels based on the comparison includes selecting transmission channels having an associated error value that exceeds the error threshold value.

* * * * *